May 31, 1932.                J. C. McCUNE                1,860,426
                      BRAKE AND POWER CONTROLLER
                        Filed June 30, 1930            2 Sheets-Sheet 1
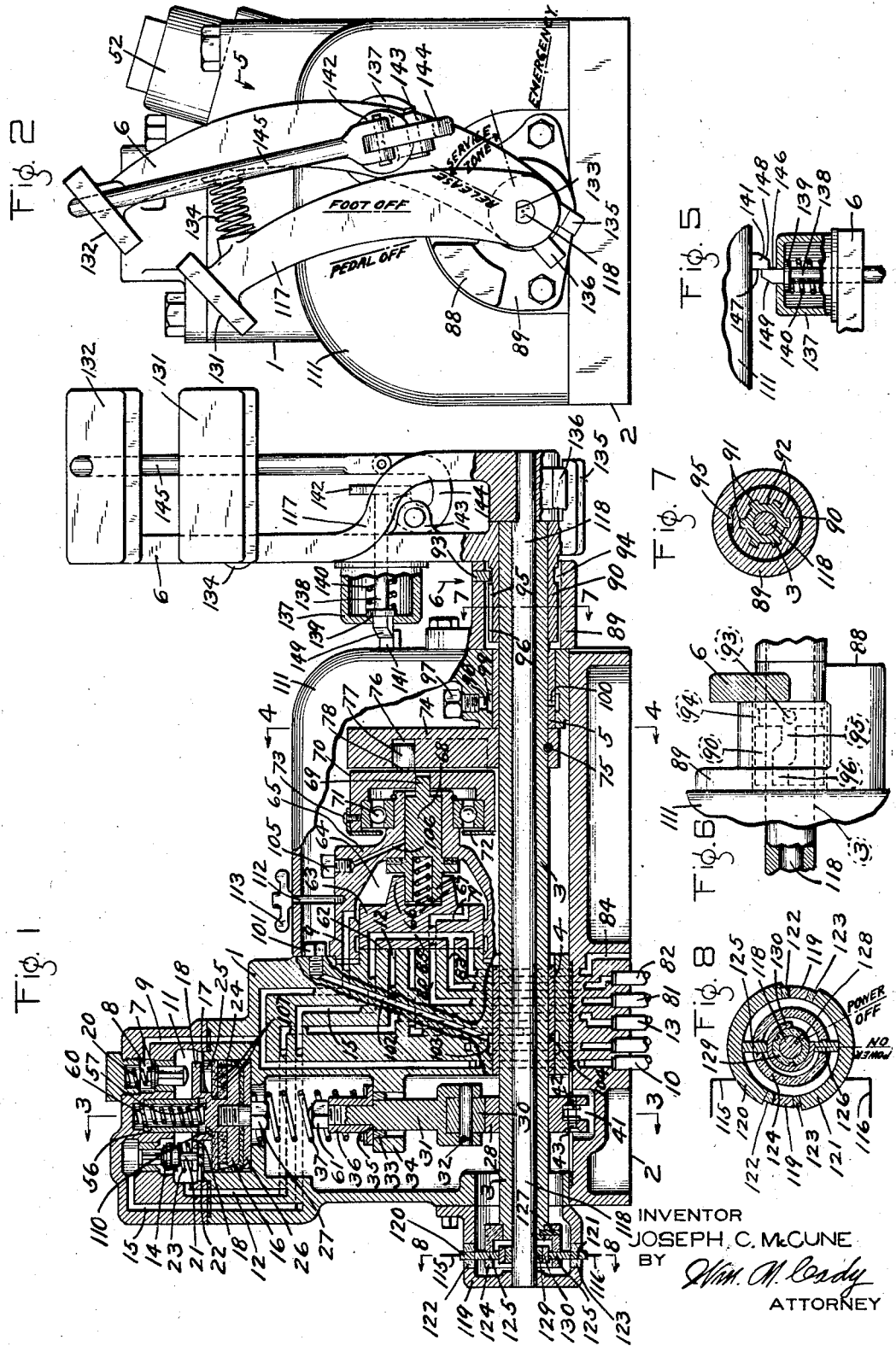
INVENTOR
JOSEPH C. McCUNE
BY
    *Wm. N. Cady*
            ATTORNEY

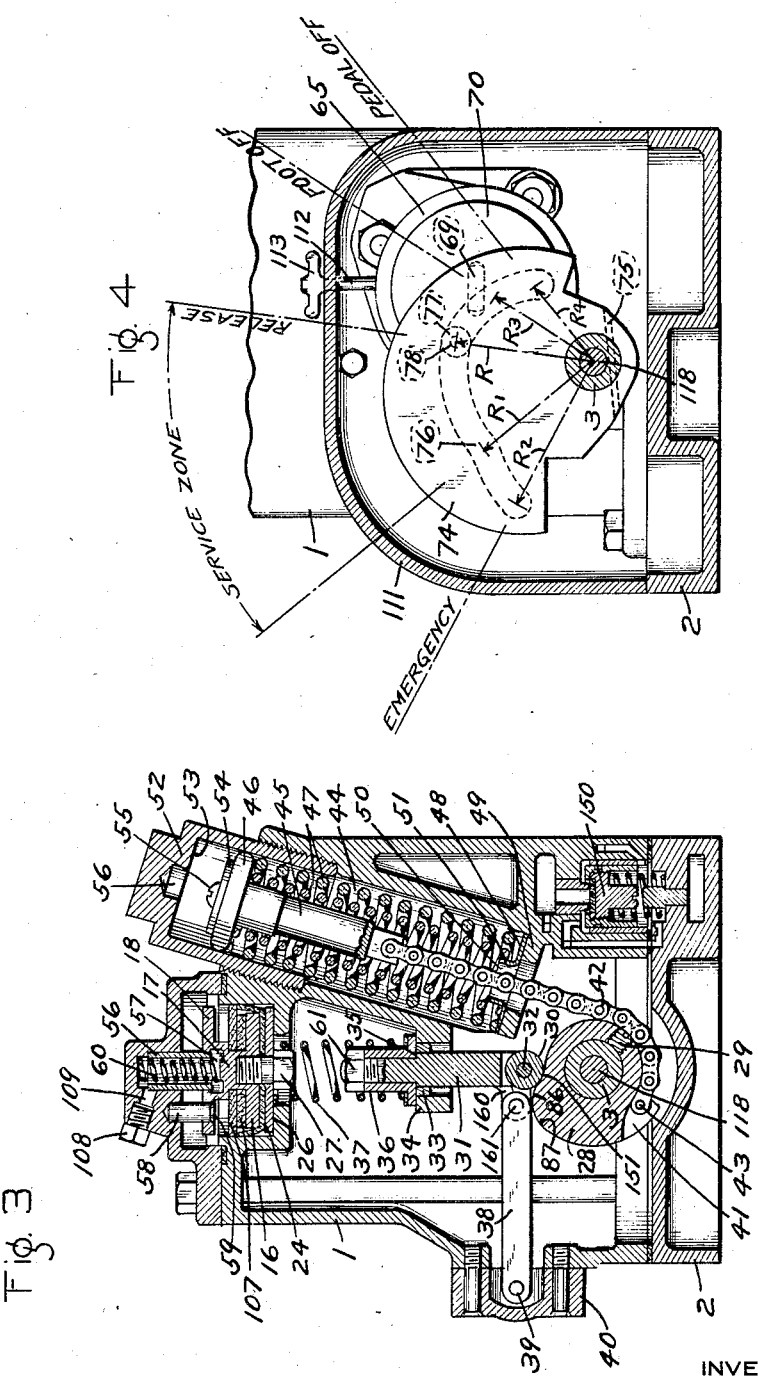

Patented May 31, 1932

1,860,426

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE AND POWER CONTROLLER

Application filed June 30, 1930. Serial No. 464,804.

This case relates to motor driven cars of the type in which a brake valve device is provided for controlling the vehicle brakes and a power controller is provided for governing the electric current supplied to the motors for propelling the car.

The principal object of my invention is to provide an improved brake valve and power controller which are combined in a single device and adapted to be operated by one foot of an operator in a manner similar to the combined brake valve device and power controller disclosed in my prior pending application, Serial No. 364,997, filed May 22, 1929.

Other objects and advantages will appear in the following more detailed description of my invention.

In the accompanying drawings; Fig. 1 is a side elevation, partly in section, of a combined foot operated brake valve and power controller device embodying my invention; Fig. 2 is an end elevation of the combined foot operated brake valve and power controller; Fig. 3 is a section taken on the line 3—3 of Fig. 1; Fig. 4 is a section taken on the line 4—4 of Fig. 1; Fig. 5 is a fragmentary view taken in the direction of the arrow 5 in Fig. 2; Fig. 6 is a plan view of a portion of the device taken in the direction of the arrow 6 in Fig. 1; Fig. 7 is a section taken on the line 7—7 of Fig. 1; and Fig. 8 is a section of the controller taken on the line 8—8 of Fig. 1.

As shown in the drawings, the combined brake valve and controller device comprises a casing 1 mounted on a pipe bracket 2 and containing a rotatable shaft 3 journalled in spaced bearings 4 and 5 and adapted to be operated by a pedal 6. Also contained in said casing is valve mechanism operable by said shaft, and hereinafter called the service valve mechanism, for controlling the service operation of the brakes on a car, and other valve mechanism operable by said shaft, and hereinafter called the control valve mechanism, for controlling the emergency brake operation on a car, the opening and closing of the doors of a car, the sanding mechanism, the circuit breaker mechanism and for interlocking the operation of the doors and brakes of the car in a manner fully described in my prior pending application, hereinbefore mentioned, and in view of this, a detailed description of the functioning of the various parts, passages, et cetera, is deemed unnecessary and will not be entered into.

The service valve mechanism comprises an application valve 7 contained in a chamber 8 for controlling communication between a passage 9 which is connected by a pipe 10 to a main reservoir (not shown) and a chamber 11 which is connected by a passage 12 to a straight air pipe 13, and a release valve 14 contained in the chamber 11 for controlling communication from the straight air pipe 13 through said chamber to the atmosphere by way of passage 15 and the control valve mechanism, as will hereinafter be more fully described.

For operating the application valve 8 and release valve 14, a relatively movable abutment is provided comprising a plunger 16 having a stem 17 connected to a flange 18 which is adapted to engage the application valve 7 for unseating said valve when said plunger moves upwardly, a spring 20 being provided in chamber 8 to seat the application valve 7 upon downward movement of said flange. The flange 18 is slotted on one side to receive a stem 21, depending from the release valve 14. The stem 21 is provided at its outer end with an enlarged head portion 22 adapted to be engaged by said flange upon downward movement thereof for unseating the release valve 14. A spring 23 is interposed between the release valve 14 and the flange for resiliently urging said valve to its seat upon upward movement of the flange.

The plunger 16 forms part of a movable, leakproof abutment further comprising a flexible packing 24 operative in a cylinder 25, a follower plate 26 and a cap screw 27 having screw-threaded engagement in the plunger 16 for clamping the packing 24 between the plunger 16 and follower plate 26.

For the purpose of operating the plunger 16 and the application valve 7 and release valve 14, a cam 28 is secured to the rotatable shaft 3 by any suitable means, such as a set screw 29. Engaging the outer surface of the cam is a roller 30 carried on a pin 32 in the lower, yolked end of a push rod 31, the upper end of which is slidably mounted in a sleeve 33 provided in a lug 34 projecting from the casing.

The diameter of the upper end of the push rod 31 is reduced, forming a shoulder 35 for supporting a spring carrying member 36 which is rigidly mounted on said push rod by a nut 61 having screw-threaded engagement with the end thereof. Interposed between the member 36 and the follower plate 26 is a spring 37 for transmitting the movement of the push rod 31 to the plate 26 for operating the application valve 7 and release valve 14.

Projecting from the lower end of the push rod 31 is a lug 160 to which one end of a tie rod 38 is secured by a pin 161, the opposite end of said tie rod being pivoted on a pin 39 in a cover plate 40 secured to the casing. By this means, the relative positions of the push rod 31 and roller 30 to the cam 28 is maintained.

The lower side of the cam 28 is provided with a recess 41 in which one end of a chain 42 is secured by a pin 43 having screw-threaded engagement in said cam. Said chain is adapted to engage the cam 28 in the manner shown in Fig. 3 of the drawings, and the opposite end of the chain extends into a chamber 44 and therein is fastened to one end of a pull rod 45. The pull rod 45 is provided at the opposite end with an enlarged head portion 46 which forms a seat for a plurality of springs 47, the opposite ends of said springs engaging a spring plate 48 which engages an apertured partition wall 49 in the casing. The spring plate 48 is provided with an opening 50 substantially in line with the aperture through the partition wall 49 and surrounding the opening 50 is a tubular like extension 51 carried by the plate 48 and projecting upwardly within the inner spring 47 and adapted to maintain the chain substantially centrally positioned within the inner spring 47, so as to permit free movement of the chain therethrough. A portion of the chamber 44 is formed within a cup-shaped member 52 having screw-threaded engagement in the casing and in this portion of the chamber, the head portion 46 of the push rod 45 is disposed.

Secured to the upper end of the push rod head 46 by a screw 55, is a rubber disc 54 adapted to resiliently engage the surface 53 of the member 52 under certain conditions of operation, as will be hereinafter more fully explained. A recess 56 is provided in the member 52 to freely receive the head of the screw 55, when the disc 54 engages the surface 53.

As hereinbefore described, the plunger 16 is adapted to move transversely of the shaft 3 in order to operate the application valve 7 and release valve 14. For guiding the plunger 16 during such movement, a hollow sleeve like member 56 is secured in the casing and slidably projects into a bore 57 in the flange 18 and stem 17 of the plunger 16. A pin 58 is also secured in the casing and slidably extends through a bore 59 in the plunger flange 18, so as to maintain operative relation between said flange and the release valve 14. A spring 60 is disposed within the member 56 and engages the plunger stem 17 for urging said plunger downwardly.

The control valve mechanism comprises a rotary valve 63 mounted on a seat 62 formed in the casing and contained in a chamber 64 formed in a cover 65 secured to the casing 1. The rotary valve is provided with a pair of driving lugs 66 into which the driving tongue 67 of a shaft 68 extends. The shaft 68 is suitably journaled in the cover 65, as shown in the drawings, and is provided with a substantially rectangular shaped driving tongue 69 which engages a corresponding recess in a hollow cup-shaped driving plate 70, an anti-friction bearing 71 being interposed between said driving plate and the cover 65 for maintaining said driving plate in alignment with the shaft 68 and for permitting free rotation thereof. The exposed side of the anti-friction bearing 71 is protected from dirt and other foreign material by a cover plate 72 secured to said bearing by any suitable means, such as a screw 73.

For turning the rotary valve 63 through the medium of the driving plate 70, a cam 74 is secured on the shaft 3 by a pin 75 and is adapted to be operated by said shaft. The cam is provided with a cam groove 76 which is adapted to receive a roller 77 mounted on a pin 78 secured in the rotary valve driving plate 70. It will be evident that as the shaft 3 is turned by the foot pedal 6, the cam 74 will operate the rotary valve 63 in accordance with the variation in distance between said groove and shaft 3, and that since the cam 28 of the service valve mechanism is mounted on the same shaft 3, the service valve mechanism and control valve mechanism will be operated simultaneously.

This brake valve device is provided with several positions, such as a release position, a foot-off position which corresponds substantially to what is popularly known as a "dead man's" position, an emergency position, and a service zone in which the degree of a service application of the brakes is automatically limited in accordance with the position of the foot pedal.

In the drawings, the brake valve device is shown in the release position in which the pressure of springs 47 acting on the pull rod head 46 and through chain 42 tends to rotate the cam 28 in a counter-clockwise direction. To counteract this tendency to rotation of the shaft 3 and cam 74 by the cam 28, the operator has to exert an opposing pressure on the foot pedal 6. It will thus be noted that in order to maintain the brake valve device in the release position, the operator has to maintain a pressure on the foot pedal 6.

With the brake valve device in release position, the cam 28 is so positioned that roller 30 engages the depression 151 of the cam surface through the expansive action of spring 37. When the spring 37 is thus expanded, the pressure of spring 60 is sufficient to hold the plunger 16 downwardly and permit the application valve 7 to be seated by the pressure of spring 20, and to hold the release valve 14 unseated by engagement of the flange 18 with the head 22 of the release valve stem 21. In this position of the release valve, the straight air pipe passage 12 is connected through chamber 11 to the release passage 15 leading to the control rotary valve 63.

In the release position of the rotary valve operating cam 74, the rotary valve 63 is so positioned that the release passage 15 from the release valve 14 of the service valve mechanism is connected to an atmospheric passage 84 through a port 85 in said rotary valve, so as to permit the brakes to be released.

Pipe 10 may be connected to a source of fluid under pressure, such as a main reservoir (not shown) and the fluid under pressure thus supplied to pipe 10 flows to the application valve chamber 8 and the rotary valve chamber 64 and from thence through a port 79 in the rotary valve 63 to passage 80 which may connect to an emergency pipe 81. With the rotary valve 63 in the release position, a door engine pipe 82 may be connected to the atmosphere through a passage 83, port 85 in the rotary valve and the atmospheric passage 84.

If the operator desires to effect a service application of the brakes, the pedal 6 is turned clockwise by the operator's foot from the release position into the service zone. This operation of the pedal turns the shaft 3 and the cams 74 and 28 which are carried by said shaft.

In Fig. 4, on which the various positions of the brake valve device are shown, in order to illustrate the position of the cam groove 76 in the cam 74 relative to the rotary valve operating roller 77, it will be noted that said cam groove is formed on the same radius in release position as through the entire service zone or in other words, the radius R to the center of the cam groove equals the radius $R_1$. Consequently, although the cam 74 is operated in the movement of the foot pedal from release position into the service zone, the position of the rotary valve roller and of the rotary valve 63 does not change. However, the corresponding clockwise rotation of cam 28 causes the roller 30 in the end of push rod 31 to roll up the incline 86 of the cam and shift the push rod 31 upwardly.

The upward movement of push rod 31 acts through spring 37 to shift the abutment, including the plunger 16, upwardly which causes the plunger flange 18 to disengage the head 22 of the release valve stem 22 and to act through spring 23 to seat the release valve 14, so as to close communication from chamber 11 to the passage 15. At substantially the same time as the release valve 14 is seated, the flange 18 engages and unseats the application valve 7 which permits fluid under pressure to flow from passage 9 to chamber 11 and from thence through passage 12 to the straight air pipe 13 for applying the brakes. When the pressure of fluid thus supplied to chamber 11 becomes built up to a degree slightly in excess of the pressure of spring 37, the pressure of fluid acting on the abutment, including the packing 24, shifts said abutment downwardly compressing spring 37 and permitting spring 20 to seat valve 7 and cut off the supply of fluid under pressure to the chamber 11, so as to effect a lap of the brakes. It will be noted that the pressure permitted to build up in chamber 11 is governed by the pressure of spring 37 which in turn depends upon the position of the push rod 31. The position of the push rod 31 is controlled by the position of the roller 30 on the incline 86 of the cam 28 which in turn is governed by the position of the foot pedal. If the foot pedal is depressed from release position only a slight amount, the roller 30 is only lifted a slight amount by the cam 28. Thus, the position of plunger 31 is such that only a low pressure in chamber 11 is required to overcome the pressure of spring 37 in order to effect a lap of the brakes. However, if the brake pedal is depressed further or to the extreme of the service zone, the plunger 31 is moved upwardly further, so that a greater pressure is required in chamber 11 to move the abutment downwardly against the greater pressure of spring 37 to effect a lap of the brakes. It is obvious that the pressure in chamber 11 may be increased in steps, if desired, by successively shifting the push rod 31 upwardly in steps, so as to necessitate a greater pressure build up in chamber 11 to move the abutment to lap position, and in this manner effect a graduated application of the brakes.

To release after an application of the brakes has been effected in the above described manner, the pressure of the operator's foot is partly removed from the brake pedal 6. The pull of springs 47 through the chain 42 on the cam 28 rotates said cam, the shaft 3 and the pedal lever 6 to release position, in which further rotation is stopped by the operator's foot pressure. In release position of the cam 28, the parts again assume the position shown in the drawings, in which the release valve 14 is unseated by engagement of the plunger flange 18 with the head portion 22 of the release valve stem 21 and fluid under pressure is permitted to flow from the straight air pipe 13 to the atmosphere through passage 12, chamber 11, passage 15, port 85 in the rotary valve 63 and atmospheric passage 84.

If desired, the release of the brakes may be graduated, by permitting the brake pedal to only partly return to the release position. This permits the push rod 31 to drop and decrease the pressure of spring 37, which permits the release valve to open and vent fluid under pressure from chamber 11. As soon as the pressure in chamber 11 is thus reduced an amount substantially equal to the decrease in pressure in spring 37, said spring shifts the abutment upwardly and seats the release valve 14, so as to effect a lap of the brakes. In this manner, the pressure in chamber 11 may be reduced in steps and a graduated release of the brakes be obtained.

It will be noted that in releasing the brakes and effecting a service application of the brakes, the rotary valve 63 is not moved, although the rotary valve operating cam 74 is operated by the shaft 3 as the foot pedal is operated.

If it is desired to effect an emergency application of the brakes, the operator pushes the foot pedal 6 through the service zone to emergency position, thereby turning the shaft 3 and the cams 28 and 74 to emergency position also. In emergency position of the cam 28, the roller 30 is operated to the maximum service position by being moved over the top of the cam incline 86 to the surface 87 and then the roller just rolls on the surface 87 of the cam without effecting any further movement of the push rod 31. It is thus seen that the service valve mechanism is operated to supply fluid under pressure to the straight air pipe 13 in the same manner as hereinbefore described in connection with effecting a service application of the brakes. In effecting an emergency application, however, the operation of the cam 74 turns the rotary valve 63 to an emergency position. It will be seen in Fig. 4 of the drawings, that in emergency position of the cam, the cam groove 76 is farther from the center of the shaft 3 than in the service zone position or in other words, the radius $R_2$ to the center of the cam groove 76 is greater than the radius $R_1$. Consequently, as the cam 74 turns after the service zone is passed, the cam groove 76 pushes the roller 77 upwardly, thereby rotating the rotary valve 63 in a clockwise direction to emergency position, in which the emergency pipe 81 is connected to the atmospheric passage 84 and the door engine pipe 82 is connected to the supply of fluid under pressure from the main reservoir in valve chamber 64, as is more fully described in my prior pending application hereinbefore referred to.

To release the brakes after an emergency application, the foot pedal and cams 28 and 74 are permitted to be returned to release position by the action of springs 47, in which position the brakes are released in the same manner as hereinbefore described.

If for any reason, the operator's foot is removed from the pedal 6, the pressure of springs 47 drive the head portion 46 of the pull rod 45 upwardly until the bumper 54 engages the surface 53. This upward movement of the pull rod 45 acting through chain 42 turns the cam 28, the shaft 3 and the cam 74 in a counter-clockwise direction to a foot-off position in which the pedal lever 6 engages a stop lug 88 mounted on a cover 89 which is secured to the casing 1.

The cam 28 is so designed that the position of the roller in respect to the shaft 3 remains the same as in release position in which the application valve 7 is seated and the release valve 14 is unseated. However, when the cam 74 is operated to foot-off position, the cam slot 76 approaches the shaft 3 since the radius $R_3$ to the center of the cam slot is less than the radius $R$, and this causes a downward pull on the roller 77 which acts to turn the rotary valve 63 in a counter-clockwise direction to the foot-off position in which the emergency pipe 81 is connected to the straight air pipe 13 to permit a sudden reduction to occur in the emergency pipe pressure for effecting an emergency application of the brakes. Other connections may also be made through the rotary valve 63, such as connecting the door engine pipe 82 to the valve chamber 64 for supplying fluid at main reservoir pressure to the door engine and for controlling the operation of a safety control valve piston 150 as is completely disclosed in my prior pending application hereinbefore mentioned.

To effect a release of the brakes after having been applied by movement of the foot pedal 6 to foot-off position, said foot pedal is moved to release position by the operator's foot, which movement operates through shaft 3 to turn the cams 74 and 28 to release position and compress the springs 47 to the position shown in the drawings, in which the brakes are released in the manner hereinbefore described.

As hereinbefore described in connection with effecting a foot-off emergency, the head portion 46 of the pull rod 45 engages the surface 53 in order to limit the rotation of shaft 3, and the pedal 6 engages the stop lug 88, this lug being provided to prevent the inertia of the foot pedal from moving it and its associated parts beyond the foot-off position.

This brake valve is adapted to be employed on a car in which the brakes may be operated from either end, which requires the brake valve at the non-operating end of the car to be rendered inoperative to control the brakes. To render this brake valve device inoperative, a pedal-off position is provided in which the pedal 6 is removable from the brake valve device and certain connections are established through the rotary valve 63 to permit control of the brakes by the brake valve device at the opposite end of the car.

The pedal 6 is provided with a hollow tube like socket 90 which extends over the shaft 3 and into the cover 89 through the open end thereof, the interior of said pedal socket being provided with slots 91 and keys 92 adapted to engage corresponding keys and slots on the shaft 3 and provide a spline type of drive for said shaft.

In the pedal socket cover 89 is disposed a key 93, preferably in the shape of a round pin, which extends within the opening through said cover and projects into an annular slot 94 provided on the exterior surface of the pedal socket. When the pedal is operated through the various positions, as hereinbefore described, this slot 94 permits free rotation of the pedal, but the pin 93 extending into said slot prevents the pedal from being removed in the usual operating positions.

To remove the pedal, the operator permits it to be turned to foot-off position by the action of springs 47, in which position said springs are spent due to the engagement of the bumper 54 with the surface 53, and the pedal just engages the stop 88. On the outer surface of the pedal socket 90 is a groove having a portion 95 connecting to the annular slot 94 and in line with the key 93 when the pedal is in foot-off position. Another portion 96 of said groove is offset from the portion 95, but is connected thereto and extends to the outer end of the pedal socket 90. With the pedal 6 in the foot-off position, the operator pulls the pedal away from the brake valve device, which is permitted by the key 93 entering and passing through the portion 95 of the groove on the pedal socket 90. When the pedal is pulled out sufficiently to clear the stop lug 88, it is turned counterclockwise to pedal-off position, this turning movement being permitted by the offset portion of the groove in the pedal socket and limited by engagement of the pin 93 with the portion 96 of said groove. With the pedal thus turned to pedal-off position, it can be pulled off, the pin 93 freely passing through the portion 96 of the groove. To apply the pedal, the above operation is just reversed.

Since the pressure of springs 47 is removed from the shaft 3 in foot-off position, the removal of the foot pedal is not opposed thereby and in pedal-off position, a certain amount of slack occurs in the chain 42. With the pedal removed however, the position of the various movable parts of the brake valve device do not change, due especially to the friction of the rotary valve 63 on its seat which is maintained by the pressure of fluid in the valve chamber 64 acting on said valve. In this connection, it will be noted, however, that the resistance to operation of the brake valve device has been reduced as low as possible by the use of the anti-friction bearing 71 and the roller bearing 77.

In order to maintain the resistance to operation of this device at a minimum, provision is made for lubricating the various moving parts. To lubricate the bearing 5, a screw plug 97 is removed and lubricant is poured into passage 98 from whence it flows through an annular groove 99 and a port 100 in the bearing to the shaft 3 after which the screw plug 97 is replaced. To lubricate the bearing 4, a screw plug 101 is removed and lubricant is poured into a passage 102 from whence it flows through an annular groove 103 and a port 104 to the shaft 3. After lubricating, the screw plug 101 is replaced. A screw plug 105 is removable for the purpose of pouring lubricant into a passage 106 leading to the rotary valve shaft 68. In the service valve mechanism, rings 107 of any oil retaining material, such as felt, are provided adjacent the plunger 16. A screw plug 108 is adapted to be removed and lubricant may then be supplied to passage 109 from whence it will flow down the interior of the hollow member 56 into bore 57 in the upper end of the plunger stem 17 and then through a port 110 in said stem to the rings 107 which will hold a quantity of lubricant and supply same through the upper ring to the wall of cylinder 25, which said ring engages.

In order to protect the cam 74, anti-friction bearing 71 and the other associated parts from dirt and foreign material, a hollow cover 111 may be fitted over same and secured against the casing 1 by a stud 112 having screw-threaded engagement in said casing and extending through said cover and a wing nut 113 adapted to engage said cover by screw-threaded engagement with the stud 112.

Associated with the brake valve device is a controller device for governing the supply of electric current through wires 115 and 116 to the motors (not shown) which are employed to propel the car. Said controller is adapted to be operated by a controller pedal 117 through the medium of a shaft 118 rotatably disposed within a bore extending lengthwise through the brake operating shaft 3.

The controller device comprises a casing 119 mounted on the brake valve casing 2 and containing two arcuate shaped fixed contacts 120 and 121 to which the wires 115 and 116, respectively, are connected, said contacts being insulated by rectangular, arcuate shaped insulators 122 and 123. A cup shaped insulator 124 carrying two contacts 125 and 126 is secured to one end of the brake valve shaft 3 by a pin 127 and is rotatable by said shaft, the contacts 125 and 126 being adapted to maintain sliding engagement with the fixed arcuate shaped contacts 120 and 121, respectively, throughout the full range of rotation of the brake valve pedal 6, which has been hereinbefore described.

Secured to the controller shaft by a pin 128 is an insulating sleeve 129 carrying an arcuate shaped contact 130 adapted to engage the inner ends of the contacts 125 and 126. The contact 130 being carried by the controller shaft 118 is rotatable relative to the contacts 125 and 126 carried in the insulating cup 124 mounted on the brake shaft and is adapted to be operated to two different positions, one position being "power on" position, as shown in the drawings, in which the wires 115 and 116 are connected through contact 120, contact 125, contact 130, contact 126 and contact 121, so as to close the circuit through the car motors (not shown), and the other position being "power off" position in which the contacts 125 and 126 are disconnected, due to the contact 130 being turned to a position in which it does not engage contact 126.

It will be noted from the above description of the controller that the operation of it is controlled by the brake valve shaft 3 as well as by the controller shaft 118. If the two shafts are moved together there is no change in the connections between contacts 125 and 126, since the contacts 120 and 121 provide engagement with contacts 125 and 126, respectively, through the full range of travel of the brake valve pedal, so as to maintain a circuit closed through wires 115 and 116, and in order to change these connections to open said circuit, relative movement between said shafts is required.

As hereinbefore described, the brake pedal 6 is provided for operating the shaft 3. According to my invention, I extend the controller shaft 118 beyond the end of the brake shaft 3 and mount on the end of said shaft, the controller pedal 117 which is so shaped as to be disposed in operating alignment with the brake pedal 6, but having the foot pad or plate 131 located to the front of and slightly below the foot plate 132 of the brake pedal, so that both foot plates may be conveniently engaged and operated by an operator's foot. To secure operating engagement between the shaft 118 and controller pedal 117, any suitable means may be provided, but I prefer to cut away a portion of the shaft, so as to form a flat surface 133 adapted to effect driving engagement with an opening through the controller pedal of corresponding size and shape.

Between the brake pedal 6 and controller pedal 117 is interposed a spring 134 for moving said pedals apart, so as to operate the controller to power off position. For limiting this separating movement, a lug 135 is provided on the pedal socket 90 which is adapted to be engaged in power off position of the controller by a lug 136 on the controller pedal.

In operation, when the brake pedal 6 and controller pedal 117 are pushed apart by spring 134 until the lugs 136 and 135 engage, the relative movement of the shafts 3 and 118 which are operated by said pedals turns the controller to power off position, but when the controller pedal 117 is moved toward the brake pedal to the position shown in Fig. 2 of the drawings, the controller is turned to power on position. In other words, relative movement between the controller pedal and brake pedal are required to open and close the motor circuit through wires 115 and 116 and this relative movement may be obtained at any time irrespective of the position of the brake pedal. It will, however, be noted that if for any reason the operator should remove his foot from the brake pedal and controller pedal, the brake pedal will be turned to foot off position in the manner hereinbefore described and the controller pedal will be moved to power off position by the automatic action of spring 134 to turn the controller pedal 117 away from the brake pedal 6.

In order to stop a car, the operator first removes his foot pressure from the controller pedal which permits it to be rotated from power on position to power off position, so as to open the circuit of the car motors through wires 115 and 116 and then or at substantially the same time, he applies pressure to the brake pedal moving it into the service zone or to emergency position, as he desires, in order to apply the car brakes in the manner hereinbefore described. Under certain conditions he may desire to have motor power applied to the car at the same time as he is applying the brakes, which can be obtained by maintaining the controller pedal in power on position when the brake pedal is moved to a brake applying position. It is thus apparent that the operator has complete and separate control of the car brakes and the car motors at the same time by one foot.

When the brake pedal 6 is in release position, the opposing pressure of the springs 47 is light and in operating the controller pedal to power on position in which the spring 134 is compressed against the brake pedal 6, there is a tendency for the brake pedal to turn slightly into the service zone in which the brakes will be lightly applied. This is undesirable and in order to prevent such from occurring when operating this brake valve and controller, I provide means for locking the brake pedal in release position against clockwise rotation, which means, however, are unconsciously unlocked by the operator when he applies pressure to the brake pedal to move it to apply the brakes and which means are also rendered ineffective upon counterclockwise rotation of the brake pedal to foot-off position.

This brake pedal locking means comprises a hollow casing 137 mounted on the brake pedal 6 and containing a plunger 138 provided with a collar 139 and a spring 140 engaging said collar for urging the shaft outwardly of the casing. One end of said shaft extends through the end wall of the casing and is adapted to engage a lug 141 on the cover 111, while the opposite end extends through the brake pedal 6 and is provided at its extremity with an enlarged head 142.

Pivotally mounted on a lug 143 of the brake pedal 6 is a U-shaped lever 144, one end of which engages the head 142 on the locking shaft 138, while the other end is pivotally connected to a push rod 145 which extends upwardly and through the brake pedal foot plate 132.

The end of the plunger shaft 138 which extends through the casing 137 and the end of the lug 141 on the cover 111 are shaped with adjacent flat surfaces 146 and 147, respectively, which, due to the action of spring 140 when the operator's foot is not engaging the pedal plate 132, are adapted to engage in release position of the brake valve, as shown in Fig. 2 of the drawings, so as to prevent clockwise rotation of the brake valve pedal 6. The opposite sides of said plunger shaft and lug 141 are provided with tapered surfaces 148 and 149 to prevent locking engagement therebetween when the brake valve pedal 6 moves in a counter-clockwise direction, as from the brake applying positions to release position or foot-off position.

In operation, when the operator's foot is not engaging the brake pedal plate 132, locking engagement between the adjacent flat surfaces of the plunger shaft 138 and lug 141 is obtained by the pressure of spring 138 as above described, and the operator may apply foot pressure to the controller pedal 117 to move it to power-on position and close the motor circuit without turning the brake pedal 6 from the release position into the service zone. If the operator desires to open the motor circuit, he may relieve the foot pressure from the controller pedal to permit spring 134 to turn same to power-off position, but in order to maintain the brake valve pedal 6 in release position when the controller is in power-off position, foot pressure must be applied to the brake valve pedal.

If the operator desires to open the car motor circuit and apply the brakes, he permits the controller pedal to turn to power off position and at the same time applies foot pressure to the brake pedal 6. In the act of engaging the foot plate 132 on the brake pedal 6, the operator's foot first engages the end of the push rod 145 and pushes it downwardly, which rotates the U-shaped lever 144 in a clockwise direction. This rotation of lever 144 acts on head 142 of the unlocking mechanism to draw the end of said plunger out of engagement with lug 141 on the cover 111 and permit free clockwise rotation of the brake pedal 6 into the service zone or to emergency position as the operator desires. To release the brakes, foot pressure is relieved from the brake pedal and the pressure of springs 47 return the pedal to release position in which position it may be held by the operator's foot, or if desired to close the motor circuit, foot pressure may be applied to the controller pedal 117 and entirely removed from the brake pedal 6 which will permit the brake pedal locking mechanism to become again effective. If while the brake pedal is in a brake applying position, the operator removes his foot from the brake pedal, the springs 47 will operate to rotate the brake pedal to foot-off position and apply the brakes in the same manner as hereinbefore described. Such a removal of foot pressure permits the spring 140 to operate the brake pedal locking mechanism and push the end of the plunger shaft 138 into the path of the lug 141 on the cover 111, however, due to the tapered surfaces on said shaft and lug which engage upon counter-clockwise rotation of the brake pedal, the plunger rod is pushed inwardly of the casing 137, permitting the brake pedal to freely pass and move to the foot-off position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake and power control device, the combination with a rotatable brake shaft and a power control shaft disposed in fixed relation to each other, of pedals controlled by the same foot of an operator for at any time operating said shafts independently of each other, one of said pedals being engaged by the toe of the operator's foot and the other of said pedals being engaged by the heel of the operator's foot.

2. In a brake and power control device, the combination with a rotatable brake shaft, of a power control shaft movable with said brake shaft and pedals controlled by the same foot of an operator for operating said shafts relative to each other.

3. In a brake and power control device, the combination with a rotatable brake shaft, of a power control shaft carried by said brake shaft and pedals controlled by the same foot of an operator for controlling the operation of said shafts.

4. In a brake and power control device, the combination with a rotatable brake shaft, of a power control shaft axially disposed within said brake shaft and pedals controlled by the same foot of an operator for controlling the operation of said shafts.

5. In a brake and power control device, the combination with a rotatable brake shaft, of a power contral shaft journaled in said brake shaft, and levers for operating said shafts.

6. In a brake and power control device, the combination with a rotatable brake shaft, valve means operated by said brake shaft for governing the brakes on a car, a power control shaft, switch means operative by said power control shaft for controlling the motive power on said car, and pedals controlled by the same foot of an operator for operating said shafts.

7. In a brake and power control device, the combination with a casing, of a rotatable brake shaft journaled in said casing, valve means controlled by the operation of said shaft for governing the brakes on a car, means for controlling the motive power on the car comprising a controller shaft disposed in fixed relation to said brake shaft, contacts fixed relative to said casing, contacts carried by said brake shaft for maintaining predetermined connections with said casing contacts upon operation of said brake shaft, a contact operable by said controller shaft for governing the motive power circuit through the controller shaft contacts and said fixed contacts, a pedal mounted on said brake shaft subject to the foot pressure of an operator for controlling the operation of said brake shaft, and a pedal mounted on the controller shaft subject to the pressure of the same foot of the operator for controlling the operation thereof relative to the brake shaft.

8. In a brake and power control device, the combination with a casing, of a rotatable brake shaft journaled in said casing, valve means controlled by the operation of said shaft for governing the brakes on a car, means for controlling the motive power on the car comprising a relatively movable controller shaft axially mounted in said brake shaft, a pair of spaced contacts fixed in said casing, a pair of contacts carried by said brake shaft and adapted to engage said fixed contacts through the range of rotation of said brake shaft, a contact carried by said controller shaft and having a power on position in which it connects the brake shaft contacts, and a power off position in which it disconnects said brake shaft contacts, a pedal mounted on said brake shaft and subject to pressure of an operator's foot for operating said shafts in one direction, resilient means for operating said shafts in the opposite direction, a pedal mounted on said controller shaft and subject to pressure of the same foot of an operator for operating the controller shaft contact to power on position, and resilient means interposed between said pedals for at another time operating said controller shaft contact to power off position.

9. In a brake and power control device, the combination with a brake controller pedal having a plurality of operating positions, a power controller pedal operable relative to said brake controller pedal to a power on position and to a power off position, and means for maintaining said pedals in fixed relation to each other when the brake controller pedal is operated with the power controller pedal in power off position.

10. In a brake and power control device, the combination with valve means for controlling the brakes on a car, of a shaft for operating said valve means, a controller device having a power on and a power off position for controlling the motive power on said car, a shaft disposed in fixed relation to said brake shaft for operating said controller device, a foot pedal for operating said brake shaft to a plurality of brake controlling positions, a foot pedal for operating said controller shaft relative to said brake shaft to power on position, resilient means for operating said controller shaft relative to said brake shaft to power off position, and means operative in power off position of the controller shaft for operating said controller by said brake shaft.

11. In a brake and power control device, the combination with a shaft operable to control the brakes on a car, a controller shaft operable to govern the motive power on the car, a brake pedal for operating the brake shaft, a controller pedal for operating said controller shaft and movable relative to said brake pedal to power on position, resilient means for moving said controller pedal relative to said brake pedal to power off position, and means operative by said brake pedal for moving said controller pedal therewith when the controller pedal is in power off position.

12. In a brake and power controller for a car, the combination with a brake pedal operative to a release position and to an application position for controlling the brakes on the car, of a controller pedal operative to a power off position and a power on position for controlling the motive power on the car, and means for maintaining said brake pedal in release position when said controller pedal is operated to power on position.

13. In a brake and power controller for a car, the combination with a brake pedal operative to a release position and to an application position for controlling the brakes on the car, of a controller pedal operative to a power off position and a power on position for controlling the motive power on the car, means for holding said brake pedal in release position when said controller pedal is operated to power on position, and means for rendering said holding means ineffective when pressure is applied to said brake pedal for operating same from release position to application position.

14. In a brake and power controller for a car, the combination with a brake pedal for controlling the brakes on a car and operative by the pressure of an operator's foot to a release position and to an application position, a controller pedal operative by the same foot of an operator and having a power off position and a power on position, a spring interposed between said pedals for moving the controller pedal to power off position and adapted to be compressed when said controller pedal is moved to power on position, holding means for preventing the compressive force of said spring from moving said brake pedal from release position to application position, release means operative by the application of foot pressure to the brake pedal for rendering said holding means ineffective, and resilient means for operating said brake pedal from application position to release position irrespective of the position of said holding means.

15. In a brake and power controller, the combination with a foot operated brake pedal having a release position and an application position, of a controller pedal having a power on position and a power off position and movable at one time with said brake pedal and at another time relative to said brake pedal, a spring operative on said pedals for moving the controller pedal relative to the brake pedal to power off position and compressible upon movement of the controller pedal to power on position, means automatically operative to prevent the compressive force of said spring from moving the brake pedal from release position to application position and manually operative by the operator's foot in the act of engaging the brake pedal to permit movement of said brake pedal to application position and adapted to permit free movement of said brake pedal from application position to release position.

16. In a brake and power control device, the combination with a casing, of a brake pedal having a pad for engagement by an operator's foot and having a release position and an application position, a controller pedal having a power off position and a power on position, a spring compressible against said brake pedal by said controller pedal upon movement thereof to power on position, mechanism carried by said brake pedal for preventing movement thereof from release position to application position by the compressive force of said spring and for permitting free rotation from application position to release position, said mechanism comprising a plunger carried by the brake pedal and having a locking face and an oppositely disposed tapered face, a lug on the casing having a locking face adapted to cooperate with the locking face of said plunger when said brake pedal is in release position and a tapered face adapted to engage the tapered face on said plunger when said brake pedal is in application position, a spring for projecting said plunger to a position to engage said lug, a lever mounted on the brake pedal for withdrawing said plunger from its projected position, and a foot operated push rod extending through the brake pedal pad and connected to said lever for operating said plunger.

17. A control device for a car comprising reciprocatory valve means and rotary valve means, a shaft for operating both of said valve means, and a lever for controlling the operation of said shaft.

18. A control device for a car comprising reciprocatory valve means and rotary valve means, a shaft, a lever for controlling the operation of said shaft, and means carried by said shaft for operating both of said valve means.

19. A control device for a car comprising reciprocatory valve means and rotary valve means, a shaft, a lever for controlling the operation of said shaft, means carried by said shaft for operating both of said valve means, and a spring operative on said shaft for opposing the operation thereof by said lever.

20. A control device for a car comprising a casing, a shaft journaled in said casing, a reciprocatory valve, a rotary valve, cam means mounted on said shaft for operating said valves, a lever for rotating said shaft in one direction, and resilient means operative on said cam means for rotating said shaft in the opposite direction.

21. A control device for a car comprising a casing, an abutment movably mounted in said casing, a valve operative by said abutment, a shaft journaled in said casing, a cam mounted on said shaft for operating said abutment, means for permitting movement of said abutment relative to said cam, resilient means for turning said shaft in one direction, and a lever for turning said shaft in the opposite direction against the opposing force of said spring.

22. A control device for a car comprising a casing, an abutment movably mounted in said casing, a valve operative by said abutment, a shaft journaled in said casing, a cam mounted on said shaft for operating said abutment, means for permitting movement of said abutment relative to said cam, a lever for operating said shaft in one direction, and a spring acting on said cam for operating said shaft in the opposite direction.

23. A control device for a car comprising a casing, an abutment movably mounted in said casing, a valve operative by said abutment, a shaft journaled in said casing, a cam mounted on said shaft, a plunger slidably mounted in said casing and operative by said cam, a spring interposed between said plunger and abutment for controlling the operation of said abutment and a pedal for controlling the operation of said shaft.

24. A control device for a car comprising a casing, a rotatable shaft mounted in said casing, a lever for controlling the operation of said shaft, a rotary valve having its seat disposed at a right angle to the axis of said shaft, and a cam mounted on said shaft and operative thereby for turning said rotary valve relative to said shaft.

25. A control device for a car comprising a service valve mechanism and an emergency and safety control valve mechanism, cam means for operating both of said mechanisms, and a pedal for controlling the operation of said cam means.

26. In a control device, the combination with a casing, of an operating shaft rotatably mounted in said casing, a pedal comprising a socket portion adapted to be removably applied to said shaft for operating same, and means requiring movement of said pedal to two different positions for effecting the removal of said socket portion from said shaft.

27. In a control device, the combination with a casing, of an operating shaft rotatably mounted in said casing, a pedal comprising a socket portion adapted to be removably applied to said shaft for operating same, and means requiring manual movement of the pedal in a direction longitudinal of said shaft and manual rotation of the pedal from one position to another position for effecting the removal of said socket portion from said shaft.

28. In a control device, the combination with a casing, of an operating shaft rotatably mounted in said casing, a pedal comprising a socket portion adapted to be removably applied to said shaft for operating same, means for maintaining said socket portion on said shaft in certain positions of said pedal and requiring movement of said socket portion to two other positions for removal from said shaft.

29. In a control device, the combination with a casing, of an operating shaft rotatably mounted in said casing, a pedal comprising a socket portion adapted to be removably applied to said shaft for operating same, and provided with an annular groove and a tortuous groove connected to said annular groove, means engaging said annular groove for maintaining said socket on said shaft in certain positions of said pedal and adapted to pass through said tortuous groove for guiding the removal of said socket from said shaft in certain other positions of said pedal.

30. In a control device, the combination with a casing, of an operating shaft rotatably mounted in said casing, a pedal comprising a socket portion adapted to be removably applied to said shaft for operating same and provide with an annular groove, means engaging said annular groove for preventing removal of said socket from said shaft in certain positions of said pedal, a lug on said casing for stopping the movement of said pedal in a certain other position, a tortuous groove in said socket connected to said annular groove for receiving said means in said certain other position for permitting partial removal of said socket from said shaft and adapted upon movement of said socket by said pedal to still another position to permit complete removal of said socket from said shaft.

31. A control device for a car comprising an abutment movably mounted in a cylinder, a rotatable shaft, means carried by said shaft for operating said abutment, a lever for controlling the operation of said shaft, means carried by said abutment and in engagement with the wall of said cylinder for holding a lubricant and conducting said lubricant to said wall, and a passageway extending through said abutment for supplying a lubricant to the means carried by said abutment.

32. A control device for a car comprising an abutment movably mounted in a cylinder, a rotatable shaft, means carried by said shaft for operating said abutment, a lever for controlling the operation of said shaft, means carried by said abutment for uniformly distributing lubricant to the wall of said cylinder, and a passageway extending through said abutment for supplying a lubricant to the means carried by said abutment.

In testimony whereof I have hereunto set my hand, this 27th day of June, 1930.

JOSEPH C. McCUNE.